United States Patent
Fukushima et al.

(10) Patent No.: US 6,799,106 B2
(45) Date of Patent: Sep. 28, 2004

(54) VEHICULAR ELECTRONIC CONTROL SYSTEM, AND ELECTRONIC CONTROL UNIT, PROGRAM, AND STORING MEMBER FOR THE SAME

(75) Inventors: Toshiyuki Fukushima, Kariya (JP); Kaname Kura, Kariya (JP); Masahir Sato, Hazu-gun (JP); Yoshiaki Kida, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/682,871

(22) Filed: Oct. 14, 2003

(65) Prior Publication Data

US 2004/0088087 A1 May 6, 2004

(30) Foreign Application Priority Data

Oct. 11, 2002 (JP) .......................................... 2002-299082
Sep. 1, 2003 (JP) .......................................... 2003-308999

(51) Int. Cl.$^7$ .............................................. G05B 19/18
(52) U.S. Cl. ........................... 701/48; 701/29; 701/33; 700/2; 714/718; 340/825.54; 340/438
(58) Field of Search ................................. 701/48, 29, 30, 701/33, 34, 43, 31, 35, 101, 76, 93; 700/2; 714/718; 340/825.54, 825.52, 426; 740/438, 425.5

(56) References Cited

U.S. PATENT DOCUMENTS

| | | | | |
|---|---|---|---|---|
| 6,275,147 B1 | * | 8/2001 | Flick | .................... 340/426.25 |
| 6,505,106 B1 | * | 1/2003 | Lawrence et al. | ............ 701/35 |
| 6,636,790 B1 | * | 10/2003 | Lightner et al. | ............... 701/33 |
| 2004/0024473 A1 | * | 2/2004 | Branz et al. | ................... 700/2 |
| 2004/0044933 A1 | * | 3/2004 | Jeddeloh | ..................... 714/718 |

FOREIGN PATENT DOCUMENTS

JP          8-265880          10/1996

OTHER PUBLICATIONS

RD 392013 A, Dec. 1996.*

* cited by examiner

*Primary Examiner*—Thomas G. Black
*Assistant Examiner*—Tuan C To
(74) *Attorney, Agent, or Firm*—Nixon & Vanderhye P.C.

(57) ABSTRACT

A vehicular electronic control system includes multiple electronic control units (ECUs) to which a tester is connectable for diagnosis. Each ECU stores a vehicle identifying number (VIN) code that is transmitted to the tester for providing various kinds of information on a vehicle. A priority level is assign to each ECU so that the ECUs transmit the VIN code in order of precedence when the ECU having higher priority is unable to transmit the VIN code when another ECU has not transmitted the VIN code. Moreover, each ECU monitors a communication line when received a VIN code transmission request from the tester and detects an output indicative the VIN code sent from another ECU to the tester. When the ECU has detected the output, it terminates the VIN code transmission and do not transmits the VIN code to the tester.

26 Claims, 12 Drawing Sheets

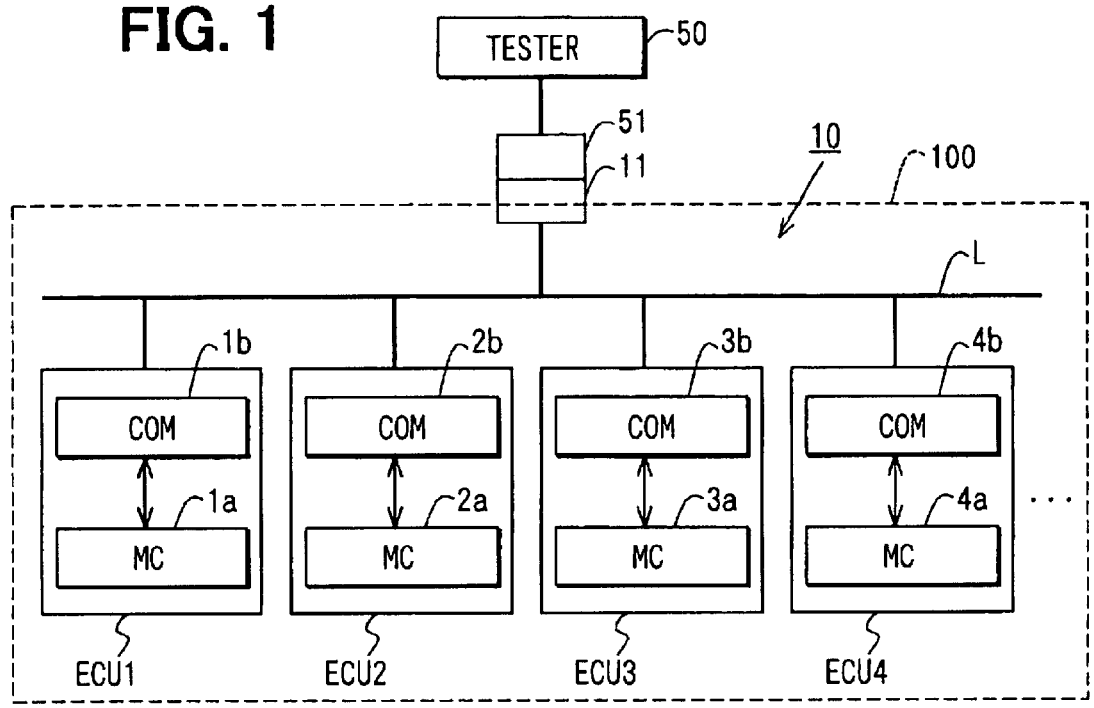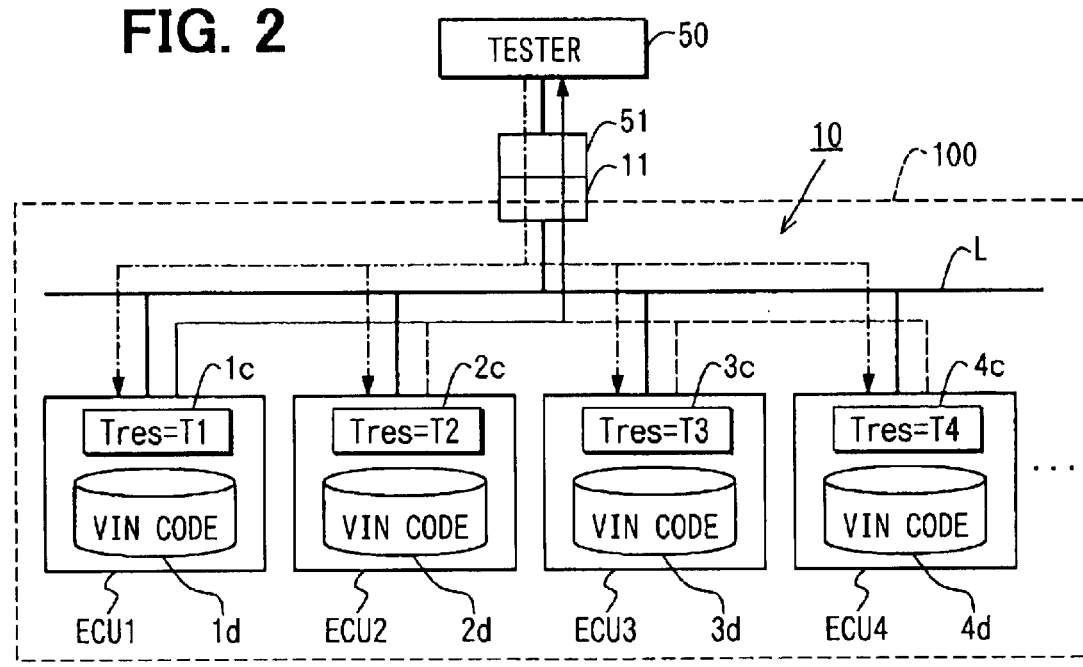

KWP MESSAGE FORMAT

| Fmt | Tgt | Src | DATA | cs |

TESTER→ECU1

| Fmt | 11 | F1 | DATA | cs |

ECU2→TESTER

| Fmt | F1 | 21 | DATA | cs |

TESTER→ECU1, 2

| Fmt | 33 | F1 | DATA | cs |

VEHICULAR ELECTRONIC CONTROL SYSTEM, AND ELECTRONIC CONTROL UNIT, PROGRAM, AND STORING MEMBER FOR THE SAME

CROSS REFERENCE TO RELATED APPLICATION

This application is based on and incorporates herein by reference Japanese Patent Applications No. 2002-299082 filed on Oct. 11, 2002 and No. 2003-308999 filed on Sep. 1, 2003.

FIELD OF THE INVENTION

The present invention relates to an electronic control unit that is able to transmit vehicle identifying information on demand from an external scan tool connected to a communication line, and a vehicular electronic control system having a plurality of the electronic control units.

BACKGROUND OF THE INVENTION

It has been proposed that a vehicular electronic control system having electronic control units (ECUs) provided for different components of a vehicle, respectively, in the manner that they communicate each other. A diagnostic system installed on a vehicle having such a system is required to be compliant with an on-board diagnostic system II (OBD-II). When an external scan tool (tester) is connected to each ECU included in the vehicle at a repair shop, a vehicle identifying number (VIN) code can be read in a predetermined communication format, such as a KWP diagnostic communication format. The VIN code is uniquely assigned to each vehicle. With the VIN code, a mechanic at the repair shop can obtain various kinds of information on the vehicle and provide appropriate repair work on the vehicle.

In such a system, if multiple ECUs simultaneously send responses to a VIN code transmission request issued by the scan tool, data collisions frequently occur on a communication line. As a result, the usability of the communication line reduces and loads on the ECUs increase. This problem will become more serious as more ECUs are connected to the communication line.

Moreover, a recently revised OBD-II regulation requires that the number of VIN codes transmitted from one vehicle must be one. To meet this requirement, only one ECU may be configured to transmit the VIN code to the scan tool. In this case, the VIN code cannot be transmitted if the ECU becomes defective or a communication line connected to the ECU is broken. To solve this problem, all onboard ECUs may be configured to transmit the VIN code to the scan tool. However, all ECUs simultaneously transmit the VIN code. This does not meet the requirement of the revised OBD-II.

SUMMARY OF THE INVENTION

The present invention therefore has an objective to provide a vehicular electronic control system having multiple ECUs in which vehicle identifying information is efficiently transmitted from one of the control units. A vehicular electronic control system of the present invention includes multiple ECUs and configured to transmit the vehicle identifying information responding to a request issued by an external scan tool that is connected to a communication line. The ECUs are intercommunicative via the communication line.

Each ECU includes a storing means, a detecting means, a timing means, and a communication means. The storing means stores the vehicle identifying information, that is, a VIN code. The detecting means monitors the communication line and detects an output indicative the VIN code sent from another ECU to the scan tool. The timing means times an elapsed time since the ECU has received the VIN code transmission request issued by the scan tool. The timing means of each ECU times an response start time preset for the ECU based on its priority level. When the time has elapsed, the communication means transmits the VIN code stored by the storing means to the scan tool if the detecting means has not detected the output from another ECU.

With this configuration, when the ECU having the highest priority, that is, having the earliest response start time, is unable to transmit the VIN code, the ECU having the next highest priority transmits the VIN code. The ECUs transmit the VIN code in order of precedence when the ECU having higher priority is unable to transmit the VIN code when another ECU has not transmitted the VIN code. Therefore, the VIN code is never transmitted from multiple ECUs.

Furthermore, collisions of data transmitted from multiple ECUs on the communication line are less likely to occur. As a result, high usability of the communication line is provided. While one of the ECUs is transmitting the VIN code, the communication means of other ECUs are not in operation. Therefore, loads on the ECUs are effectively reduced, especially when the system has a large number of ECUs.

Still further, other ECUs do not transmit the VIN code when one of the ECUs has transmitted the VIN code. Thus, the system can satisfy the revised OBD-II requirement.

BRIEF DESCRIPTION OF THE DRAWINGS

The above and other objectives, features and advantages of the present invention will become more apparent from the following detailed description made with reference to the accompanying drawings. In the drawings:

FIG. 1 is a block diagram showing a schematic view of a vehicular electronic control system according to the first embodiment of the present invention;

FIG. 2 is an explanatory diagram showing a communication procedure for vehicle identifying information according to the first embodiment;

DETAILED DESCRIPTION OF THE PREFERRED EMBODIMENT

Figures 3A, 3B, 3C:
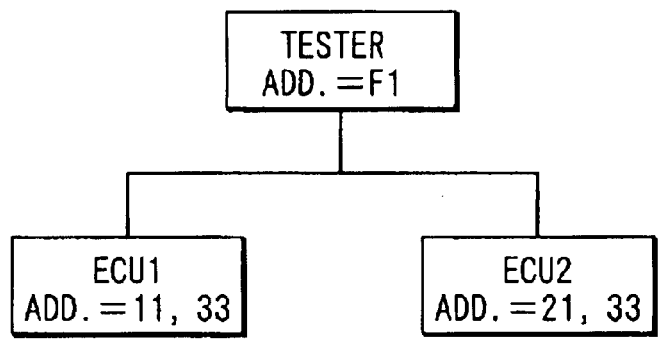
FIG. 3A is an explanatory diagram showing a communication protocol in a KWP message format according to the first embodiment.
FIG. 3B is an explanatory diagram showing addresses set in a tester and ECUs 1 and 2 according to the first embodiment.
FIG. 3C is an explanatory diagram showing communication protocols sent from the tester to the ECU 1, from ECU 2 to the ECU 2, and from the tester to the ECUs 1 and 2 according to the first embodiment.

The preferred embodiments of the present invention will be explained with reference to the accompanying drawings. In the drawings, the same numerals are used for the same components and devices.

First Embodiment

Referring to FIG. 1, the vehicular electronic control system 10 is installed on a vehicle 100, and includes electronic control units (ECUs) 1, 2, 3, 4, an engine ECU 1 for controlling an engine, a transmission ECU 2 for controlling an automatic transmission, a driving control ECU 3 for controlling a braking system, and a body ECU 4 for controlling power windows or power door locks. Each ECU 1, 2, 3, 4 is an independent electronic control unit having a microcomputer (MC) 1a, 2a, 3a, 4a that executes predetermined data storing and operations as a main component, and a communication part (COM) 1b, 2b, 3b, 4b. The ECUs 1, 2, 3, 4 are connected to each other via a communication line L.

The MC 1a, 2a, 3a, 4a of each ECU 1, 2, 3, 4 includes a CPU, a ROM, a RAM, an A/D converter, an input and output (I/O) interface, bus lines (all not shown), and a timer 1c, 2c, 3c, 4c. The CPU controls various devices, the ROM stores various values and programs that are written in advance, and the RAM has storage areas predetermined for storing values and flags during calculation. The A/D converter converts analog input signals to digital signals, the I/O interface receives various digital signals and transmits various digital signals, the timer 1c, 2c, 3c, 4c is a timing means, and all these components are connected to the bus lines.

Each ECU 1, 2, 3, 4 also includes nonvolatile memory 1d, 2d, 3d, 4d, such as an EEPROM, a backup RAM, and a flash memory, for storing a VIN code (vehicle identifying information) or diagnostic information. A process shown by a flowchart, which will be discussed later, is performed based on a control program stored in the ROM in advance.

Specifically, the engine ECU 1 having the MC 1a is configured to perform specific communication processing via the COM 1b. The engine ECU 1 is connected to various sensors, switches, and actuators, such as an accelerator pedal sensor, an airflow meter, an intake temperature sensor, a throttle angle sensor, an oxygen sensor, a coolant temperature sensor, a crank angle sensor, an ignition switch, injectors, an igniter, a fuel pump, and a throttle driving motor.

The accelerator pedal sensor detects an angle of accelerator pedal depressed by a driver. The airflow sensor, the intake temperature sensor, and the throttle angle sensor detect the amount of airflow (intake air amount), the temperature of the intake air, and an angle of the throttle valve, respectively. The oxygen sensor, the coolant temperature sensor, and the crank angle sensor detect the concentration of oxygen in exhaust air, the temperature of the coolant, and a rotation angle or a rotation speed of a crank shaft, respectively. The injectors are provided one for each cylinder of the engine. The igniter produces a high voltage output for ignition, the fuel pump pumps up fuel from a fuel tank and supplies it to the injector, the throttle driving motor opens or closes a throttle valve provided in an intake air duct of the engine.

The transmission ECU 2 having the MC 2a is configured to perform specific communication processing via the COM 2b. The transmission ECU 2 is connected to sensors, switches, and actuators, including a revolution speed sensor, a vehicle speed sensor, an oil temperature sensor, a shift position switch, a shift solenoid, a line pressure solenoid, and a lockup pressure solenoid.

The driving control ECU 3 having the MC 3a is configured to perform specific communication processing via the COM 3a. The driving control ECU 3 controls an antilock brake unit (ABS). It also controls an automatic cruise control (ACC) system, a vehicle stability control (VSC) system, a traction control (TRC) system together with the engine ECU 1. The driving control ECU 3 is connected to a master cylinder pressure sensor, a steering sensor, a yaw rate sensor, and a brake actuator.

The body ECU 4 having the MC 4a is configured to perform specific communication processing via the COM 4b. The body ECU 4 is connected to a revolution speed sensor for the driving motor, a power window switch, a door lock switch, a power window motor, and a door lock motor.

The communication line L is connectable to a tester 50 via a connector 11 located on the vehicle side. The tester 50 is an OBD-II-compliant external diagnostic system having a communication part, a MC, a storage device, a display device, an input device, and a connector 51. Examples of these devices are an IC card, an LCD, and a keyboard. The connector 51 is provided for detachably connecting the tester 50 to the connector 11. The tester 50 communicates with each ECU 1, 2, 3, 4 using keyword protocol (KWP) 2000 communication protocols. When the connector 51 is connected to the connector 11 and a request for transmitting a VIN code or diagnosis information is inputted by a service person via the input device, the tester 50 communicates with each ECU 1, 2, 3, 4. When the tester 50 receives a response from the ECU 1, 2, 3, 4, it displays transmitted information on the display device.

Next, communication between the tester 50 and the electronic control system 10 using the KWP 2000 protocols will be discussed referring to FIGS. 2 through 4. A communication format (KWP message format) of the KWP 2000 protocols includes Fmt (format), Tgt (target address), and Src (source address) in a header followed by Data (VIN code) and cs (checksum) as shown in FIG. 3A. In a normal operation, each ECU 1, 2, 3, 4 determines whether Tgt contains its own address, and receives data if Tgt contains its own address. In a monitoring process that will be discussed later, it receives the data regardless of the Tgt.

Referring to FIG. 3B, F1 is set as an individual address of the tester 50, an individual address 11 and a common address 33 are set for the ECU 1 and an individual address 21 and a common address 33 are set for the ECU 2. The common address 33 is an address of ECUs for accessing all ECUs 1, 2, 3, 4. Therefore, as shown in FIG. 3C, when data is transmitted from the tester 50 to the ECU 1, Tgt=11 and Src=F1, and when data is transmitted from the tester 50 to the ECU 2, Tgt=F1 and Src=21. When data is transmitted from the tester 50 to both ECU 1 and ECU 2, Trg=33 and Src=F1. Individual addresses and the common address are set in the same manner for the ECU 3 and ECU 4.

Referring to FIG. 2, the connector 51 of the tester 50 is connected to the connector 11, and a request for transmitting a VIN code is issued to each ECU 1, 2, 3, 4 inputted by the service person via an input device. Data flow of this operation is indicated with broken-line arrows. When the ECU 1, 2, 3, 4 receives the request, the ECU 1, 2, 3, 4 activates its timer 1c, 2c, 3c, 4c to start timing the response start time. Only one of the ECUs 1, 2, 3, 4 transmits the VIN code to the tester 50 at a time. Data flow in the case that the ECU 1 transmits the VIN code to the tester 50 is indicated with a solid-line arrow. An order for transmitting the VIN code is predetermined based on the response start time.

The response start time is set in ascending order of the ECU 1 (T1), the ECU 2 (T2), the ECU 3 (T3), and the ECU 4 (T4), that is, T1<T2<T3<T4. If the ECU having the highest priority cannot transmit the VIN code due to failure or break, the ECU having next higher priority transmits the VIN code.

Figure 4:
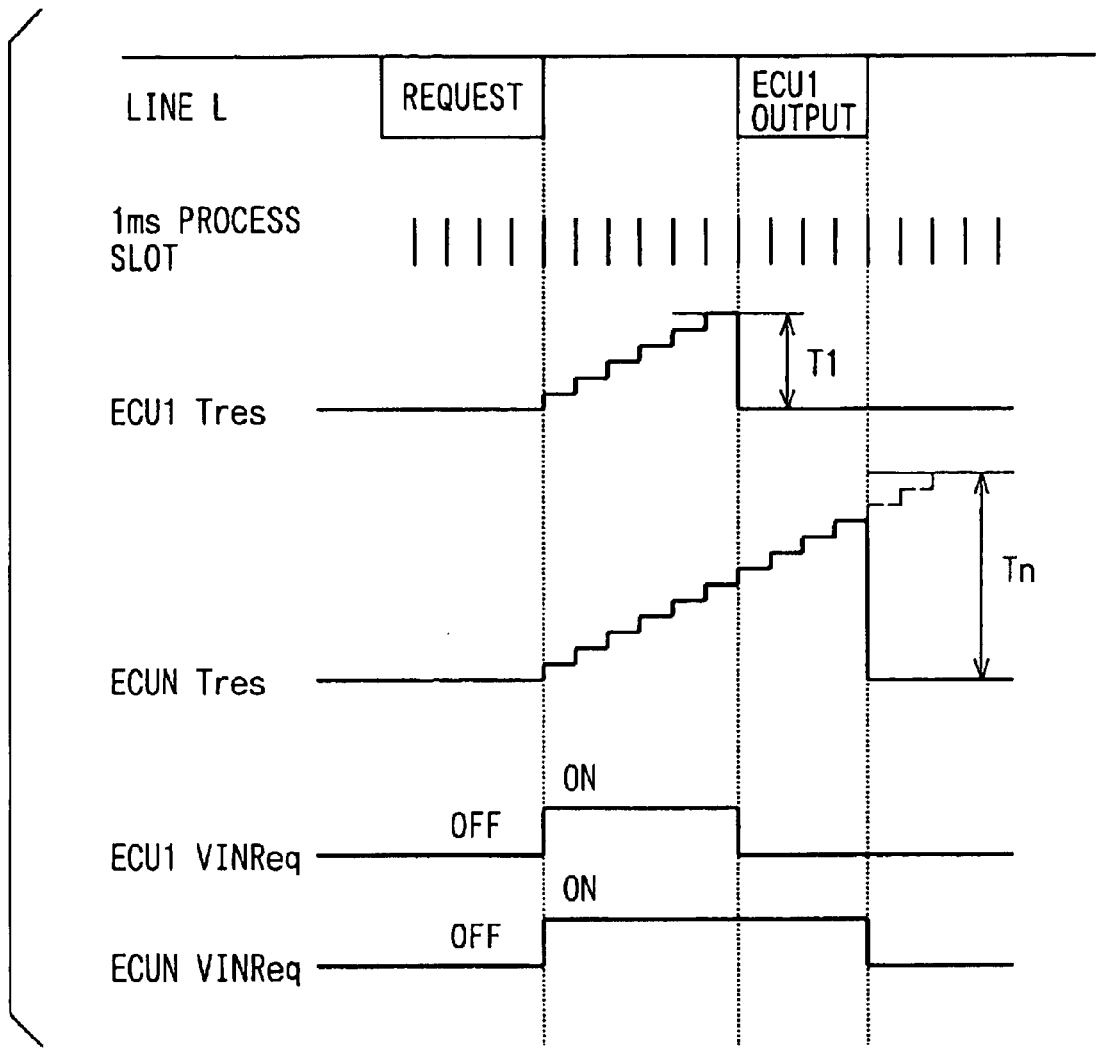
FIG. 4 is an explanatory diagram showing a communication procedure for the vehicle identifying information according to the first embodiment.
Figure 5:
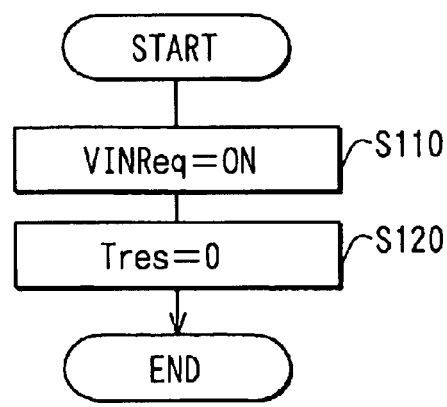
FIG. 5 is a flowchart showing a communication processing of the vehicle identifying information according to the first embodiment.

As shown in FIG. 4, when the ECU 1 and ECUN (N=2, 3, 4) receive the VIN code from the tester 50, each ECU 1, 2, 3, 4 sets a VIN code request flag VINReq to ON, and activates its timer 1c, 2c, 3c, 4c. The timer 1c, 2c, 3c, 4c times in a slot of a 1-ms process, that is, every one millisecond, based on an internal clock of the MC 1a, 2a, 3a, 4a. The 1-ms process will be discussed later.

When time count Tres of the timer reaches the response start time T1, the ECU 1 starts transmitting the VIN code and clears the count Tres. At this time, the ECUN continues the count of the timer and monitors the VIN code transmission performed by the ECU 1 via the communication line L. When the VIN code transmission by the ECU 1 is completed, the ECUN stops the count of the timer, clears the count, and stops monitoring.

The response start time Tn of the ECUN is set with intervals, each of which is longer than the time required for transmitting the VIN code. More specifically, an interval is set longer than the time for which the ECU 1, 2, 3, 4 having one higher priority completes sending the data up to cs shown in FIG. 3A. Even when the ECU 1, 2, 3, 4 is unable to transmit the VIN code, the ECU 1, 2, 3, 4 having the next higher priority transmits the VIN code after it confirms the condition that the ECU 1, 2, 3, 4 with higher priority is unable to transmit the VIN code.

The response start time T1, T2, T3, T4 of the ECU 1, 2, 3, 4 with the lowest priority, that is, having the slowest response start time T1, T2, T3, T4, is set equal to or shorter than the time that satisfies the OBD-II requirement. Therefore, the ECUs 1, 2, 3, 4 other than this ECU 1, 2, 3, 4 are unable to transmit the VIN code, the OBD-II requirement is satisfied by transmitting the VIN code by this ECU 1, 2, 3, 4.

When the ECU 1 has successfully transmitted the VIN code to the tester 50, other ECUs 2, 3, 4 do not transmit the VIN code. If the ECU 1 fails to transmit the VIN code, the ECU 2 that have the second highest priority transmits the VIN code when the response start time T2 has elapsed. If neither the ECU 1 nor the ECU 2 fails to transmit the VIN code, the ECUN having the next highest priority transmits the VIN code when the response start time Tn has elapsed. At this time, the other ECUs 1, 2, 3, 4 perform the same process described above.

Figure 6:
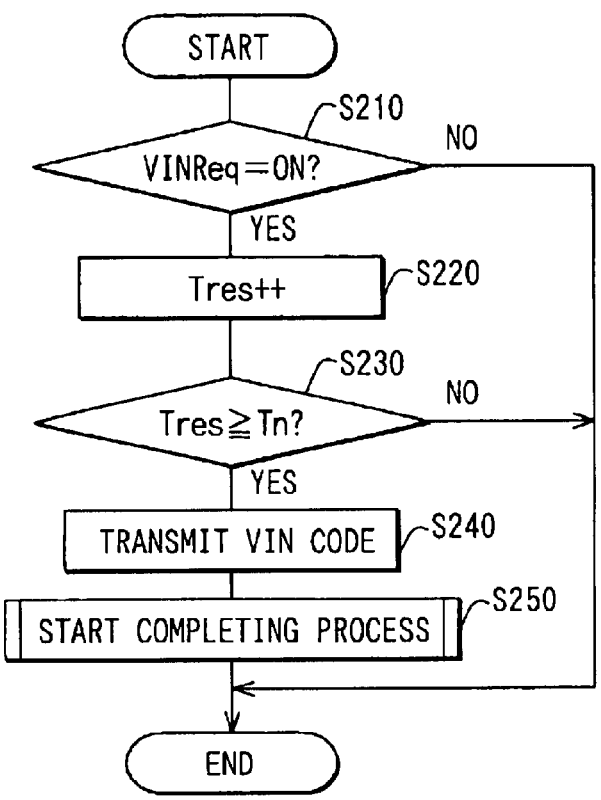
FIG. 6 is a flowchart showing a communication processing of the vehicle identifying information according to the first embodiment.

Next, the communication processing performed by the MC 1a, 2a, 3a, 4a of each ECU 1, 2, 3, 4 will be discussed referring to the flowcharts shown in FIGS. 5 through 8. When the MC 1a, 2a, 3a, 4a receives the VIN code transmission request from the tester 50 (S110), a VIN code request flag VINreq is set (ON). The flag VINreq indicates that the request has been received, and the count Tres of the timer is cleared (0) for activating the timer that counts down to the response start time. Then, 1 ms process shown in FIG. 6 is performed every one millisecond. In other words, when the flag VINReq is ON (S210: YES), the count Tres is incremented by 1 (S220).

It is determined whether the count Tres is larger than the response start time Tn (S230). If it is determined that the count Tres is larger than the response start time Tn (S230: YES), the VIN code is read from the nonvolatile memory 1d, 2d, 3d, 4d (S240), and a completing process, which will be discussed later, is started (S250). If the flag VINReq is OFF (S210: NO) or the count Tres is smaller that the response start time Tn (S230: NO), the 1 ms process is terminated.

Figure 7:
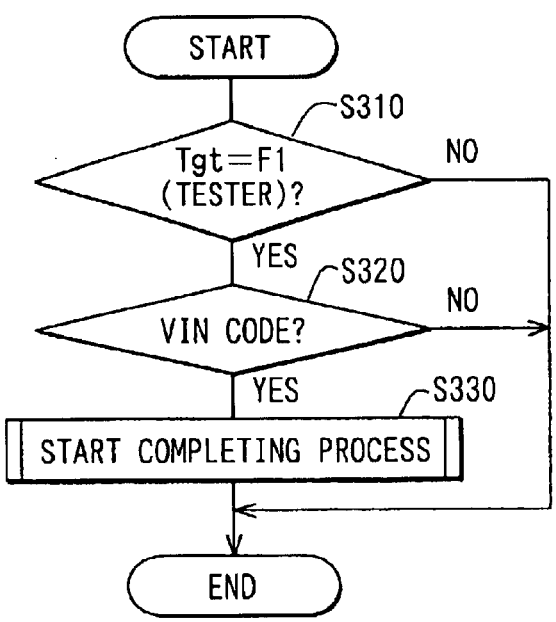
FIG. 7 is a flowchart showing a communication processing of the vehicle identifying information according to the first embodiment.

A monitoring process shown in FIG. 7 is performed in parallel with the 1 ms process. Each ECU 1, 2, 3, 4 starts monitoring the communication line L when it receives the VIN code transmission request from the tester 50, and detects the target address Tgt to which another ECU 1, 2, 3, 4 has transmitted the VIN code (S300). If the target address Tgt is the address F1 of the tester 50 (S310: YES), the ECU 1, 2, 3, 4 detects content Data of the data to determine whether it is a VIN code. If the content Data is a VIN code (S320: YES), it is determined that the VIN code has been transmitted to the tester 50 by another ECU 1, 2, 3, 4, and starts a completing process that will be discussed later (S330). If the address Tgt is not the address F1 (S310: NO) or the content Data is not a VIN code (S320: NO), the process is terminated.

Figure 8:
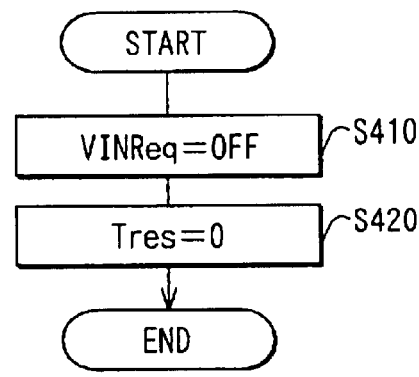
FIG. 8 is a flowchart showing a communication processing of the vehicle identifying information according to the first embodiment.

As shown in FIG. 8, each ECU 1, 2, 3, 4 sets the VIN code request flag VINReq to OFF and clears the count Tres in the termination process. Then, the ECU 1, 2, 3, 4 completes the process. In the electronic control system 10, priorities for transmitting the VIN code to the tester 50 is given to the ECUs 1, 2, 3, 4. If the ECU 1, 2, 3, 4 with a high priority cannot successfully transmit the VIN code due to a failure or a line breakage, other ECUs 1, 2, 3, 4 transmit the VIN code in order of decreasing precedence. As a result, the VIN code is transmitted to the tester 50 responding to the request without fail.

When the ECU 1, 2, 3, 4 receives the VIN code request from the tester 50, it starts monitoring the communication line L, and when the transmission process performed by another ECU 1, 2, 3, 4 has been completed, it terminates the rest of the VIN code transmission process and do not transmit the VIN code. In other words, the VIN code is not simultaneously transmitted from multiple ECUs 1, 2, 3, 4, and data collisions on the line L are less likely to occur. Therefore, the OBD-II requirement that the number of VIN codes transmitted from one vehicle must be one is satisfied.

Furthermore, when the VIN code transmission process performed by another ECU 1, 2, 3, 4 has been completed, the ECU 1, 2, 3, 4 terminates the rest of the VIN code transmission process. Therefore, load on each ECU 1, 2, 3, 4 can be effectively reduced. The effectiveness of this reduction increases as the number of ECUs connected to the line L increases. The nonvolatile memories 1d, 2d, 3d, 4d, included in the ECUs 1, 2, 3, 4 correspond to the storage means, and the MCs 1a, 2a, 3a, 4a correspond to the detecting means and the communication means. The timers 1c, 2c, 3c, 4c correspond the timing means.

First Modification of the First Embodiment

In the first embodiment, the response start time Tn of each ECU 1, 2, 3, 4 is fixed. However, the response start time Tn can be altered according to the circumstances. The ECU 1, 2, 3, 4 determines whether another ECUs 1, 2, 3, 4 with higher priority than itself is unable to transmit data during the normal operation of the ECU 1, 2, 3, 4 before the VIN code transmission request is issued. If it determines that one of the ECU 1, 2, 3, 4 with higher priority than itself is unable to transmit data, it shortens its response start time when the VIN code transmission request is issued.

Figure 9A:
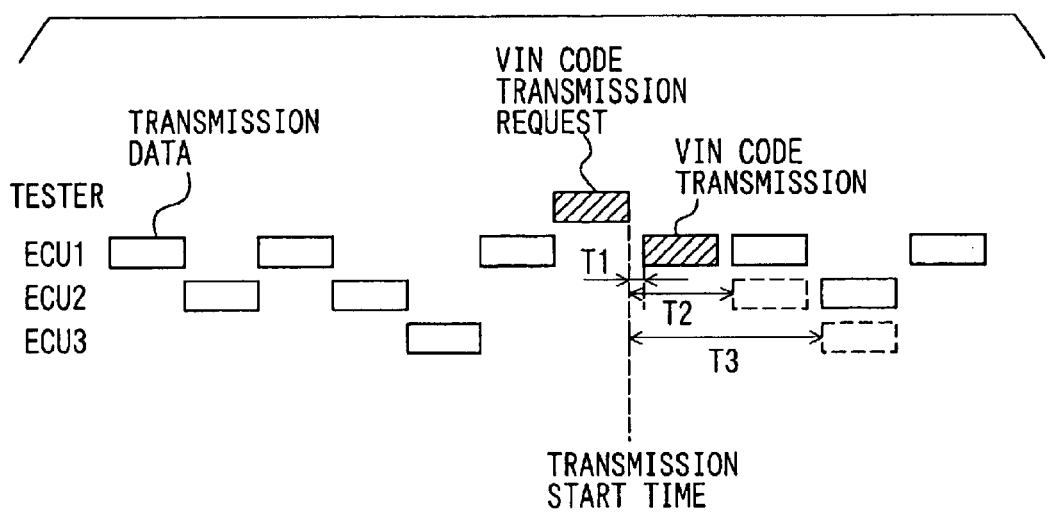
FIG. 9A is an explanatory diagram showing a communication procedure for vehicle identifying information according to the first modification of the first embodiment.

Referring to FIG. 9A, if the ECU 1 and the ECU 2 are able to transmit data, the response start time T2 of the ECU 2 is set longer than that of the ECU 1, which has higher priority than the ECU 2. The response start time T3 of the ECU 3 is set longer than the response start time T2 if the ECU 1, the ECU 2, and the ECU 3 are able to transmit data.

Figure 9B:
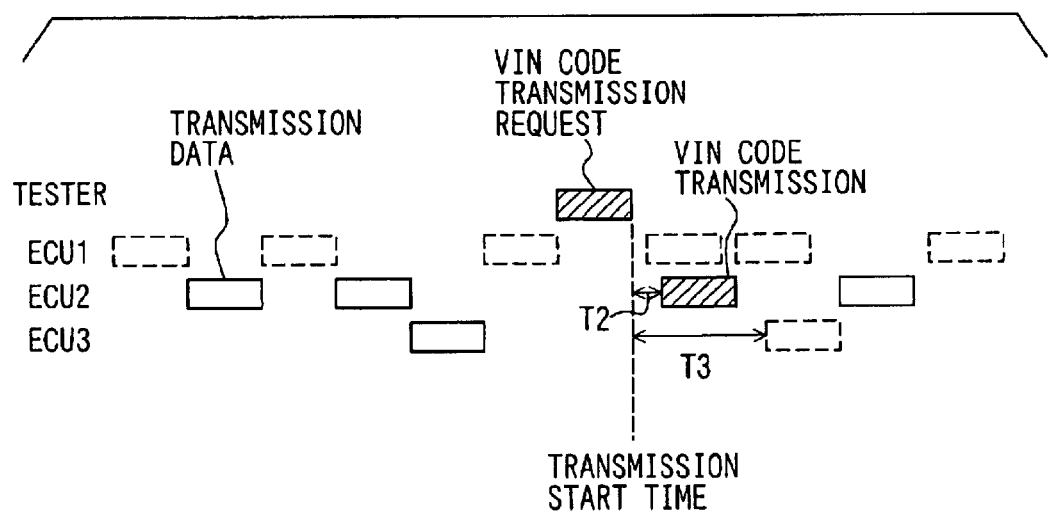
FIG. 9B is an explanatory diagram showing a communication procedure for vehicle identifying information in a condition that the ECU 1 is unable to transmit data according to the first modification.

Referring to FIG. 9B, if the ECU 1 is unable to transmit data, the ECU 2 and the ECU 3 with lower priorities than the ECU 1 start monitoring the communication line L. When it is determined that the ECU 1 is unable to transmit data based on a condition that no data is transmitted by the ECU 1 to the line L, the ECU 2 and the ECU 3 shorten their response start time T2, T3. In other words, when the ECU 1 is unable to transmit data, the ECUN with lower priority shortens its response start time Tn by the response start time T1.

The communication processing performed by the MC 1a, 2a, 3a, 4a will be discussed referring to FIGS. 10 and 11. Steps shown in S590–S630 are the same as steps of S210–S250 shown in FIG. 6. Therefore, the detailed discussion about the steps S590–S630 will not be discussed here.

Figure 10:
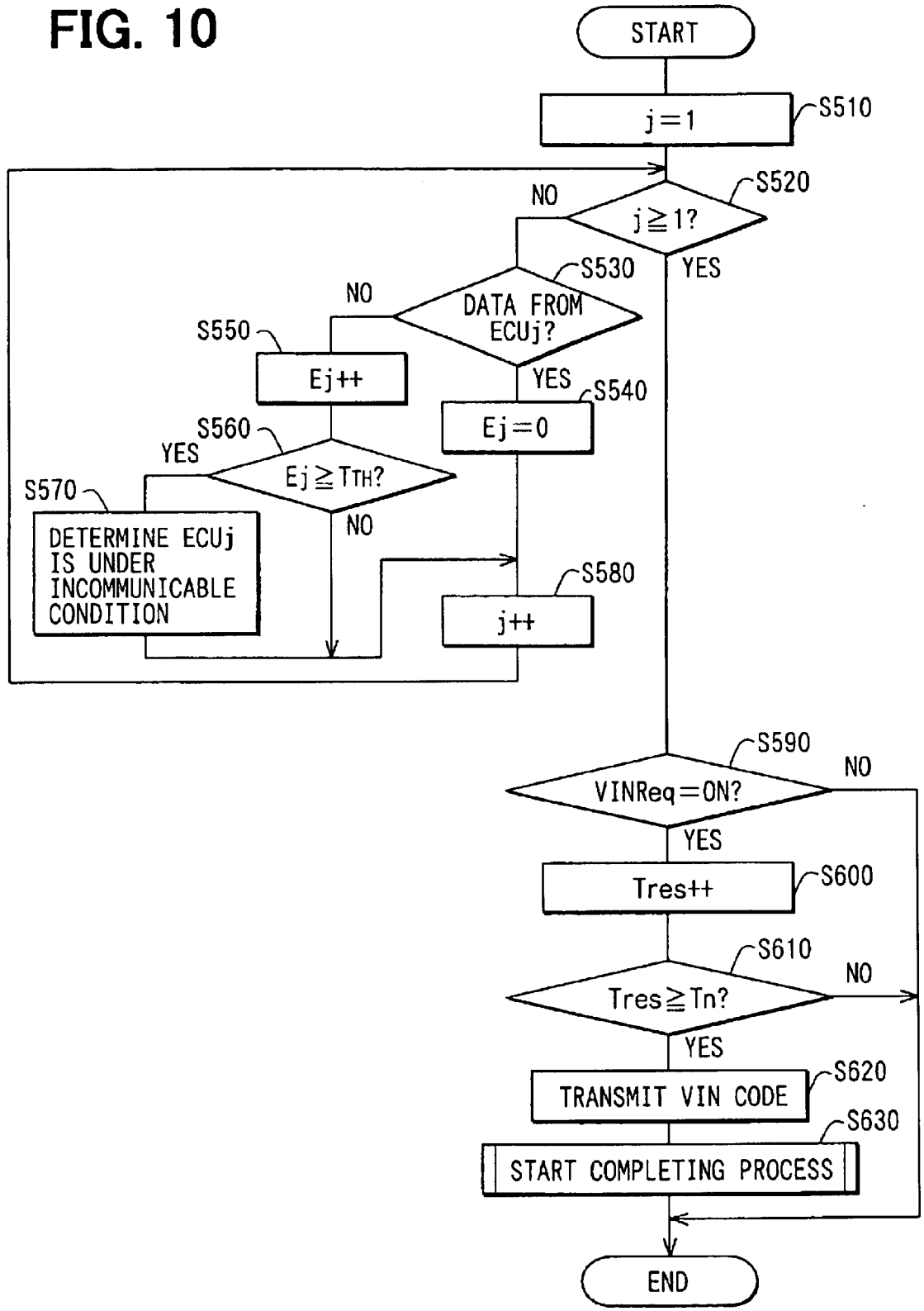
FIG. 10 is a flowchart showing a communication processing of the vehicle identifying information according to the first modification.

In a 1 ms process shown in FIG. 10, a variable j is set to a default value 1 (S510). It is determined whether the variable j is equal to or higher than a priority level n that is assigned to the ECU 1, 2, 3 (S520). The priority level is assigned to each ECU 1, 2, 3 in order of decreasing precedence starting from the ECU 1 having the highest priority, that is, having the shortest response start time. Each ECU 1, 2, 3 stores its priority level and other ECUs' priority levels in advance. Since the ECU 1, the ECU 2, and the ECU 3 have relationships of T1<T2<T3, their priority levels are 1, 2, and 3, respectively.

If the variable j is lower than the priority level n (S520: NO), it is determined whether the ECU 1, 2, 3 having the priority level expressed by the variable j has transmitted data (S530). When the variable j is lower than the priority level n, the priority level expressed by the variable j is higher than the priority level n. In step S530, more specifically, when the data that contains the source address Src indicative of the address of the ECU 1, 2, 3 with priority level j is detected on the line L, it is determined that the data is transmitted by the ECU 1, 2, 3. When it is determined that the data is transmitted from the ECU 1, 2, 3 with priority level j (S530: YES), a time count Ej for measuring the time during which the ECU 1, 2, 3 with precedence j has not transmitted data is cleared (S540).

When it is determined that the data is not transmitted from the ECU 1, 2, 3 with precedence j (S530: NO), the count Ej is incremented by 1 (S550). Then, it is determined whether the count Ej reaches a threshold time preset to the ECU 1, 2, 3 with precedence j for determining an incommunicable condition (S560). If the count Ej has reached the threshold time (S560: YES), it is determined that the ECU 1, 2, 3 with precedence j is under a communicable condition (S570). In other words, it is determined that the ECU 1, 2, 3 is under the incommunicable condition when the data supposed to be periodically transmitted has not been detected. As a result, it is preferable that the threshold time for incommunicable condition determination is set for each ECU1, 2, 3 based on a data transmission rate of the ECU 1, 2, 3 under the communicable condition. If the ECU 1 transmits data, such as engine revolution speed information, every 8 ms, the threshold time may be set to 80 msec. The system may be configured so that it determines the communicable condition when the data is transmitted from the ECU 1, 2, 3 after the incommunicable condition is determined.

After step S540 or S570 is completed, or it is determined that the count Ej has not exceeded the threshold time in step S560 (S560:NO), the variable j is incremented by 1 (S580) and the process is returned to step S520. If the variable j is equal to or higher than the priority level n, that is, the priority level expressed by the variable j is equal to or lower than the priority level n (S520: YES), steps S590 through S630 are performed in the same manner as steps S210 through S250 of the first embodiment, and this 1 ms process is completed. In this 1 ms process, it is determined whether any ECU 1, 2, 3 with higher priority than the priority level n is unable to transmit data exists.

Figure 11:
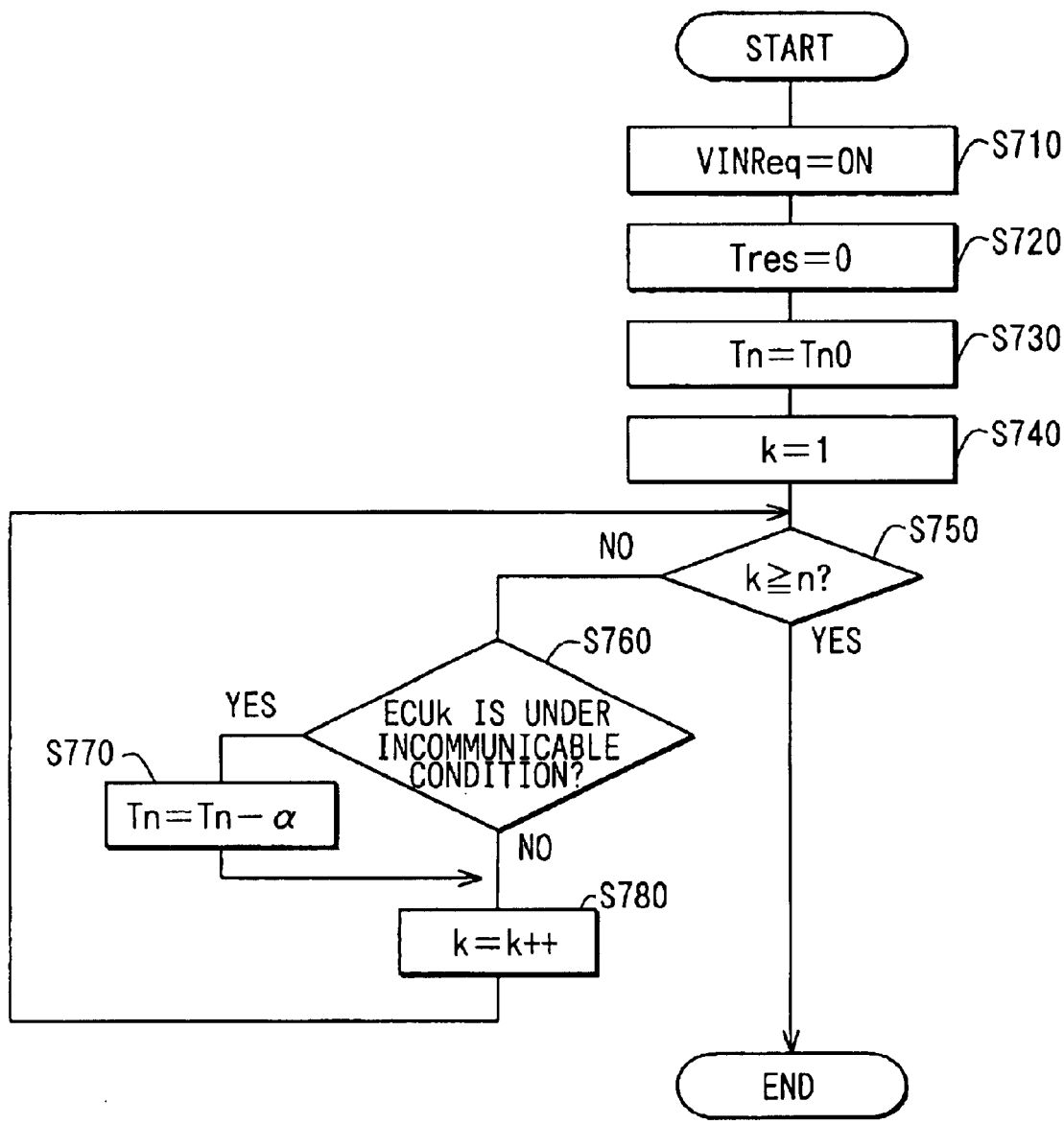
FIG. 11 is a flowchart showing a communication processing of the vehicle identifying information according to the first modification.

Referring to FIG. 11, a process for receiving the VIN code transmission request from the tester 50 will be discussed. When received the VIN code transmission request from the tester 50, the ECU 1, 2, 3 performs steps S710 and S720 in the same manner as steps S110 and S120 of the first embodiment. Then, it assigns the default value Tn0 (n=1, 2, 3) of the response start time preset for each ECU 1, 2, 3 to a variable Tn that expresses its response start time. The default value Tn0 is set to the value same as the response start time Tn of the first embodiment.

A variable k is set to a default value 1 (S740). It is determined whether the variable k is equal to or higher than the priority level n (S750). If the variable k is lower than the priority level n, that is, the priority level expressed by the variable k is higher than the priority level n (S750: NO), it is determined whether the ECU 1, 2, 3 with the priority level k is determined that it has been under the incommunicable condition in step S570 (S760). If the ECU with precedence k is determined that it has been under the incommunicable condition (S760: YES), a fixed value . is subtracted from the response start time Tn (S770). In other words, the response start time Tn is shortened by the fixed value .. The fixed value . is set to the time required for the ECU to complete the VIN code transmission.

If the ECU 1, 2, 3 with the priority level k is determined that it has been under the communicable condition (S760: NO), or after the completion of step S770, the variable k is incremented by 1 (S780) and the process is returned to step S750.

If the variable k is equal to or higher than the priority level n, that is, the priority level expressed by the variable k is equal to or lower than the priority level n (S750: YES), the process is completed. In this process, the response start time Tn is shortened according to the number of ECUs 1, 2, 3 with the priority level higher than n under the incommunicable condition. The response start time Tn determined in this process is used in step S610 of the 1 ms process shown in FIG. 10.

When the ECU 1, 2, 3 with higher priority level under the incommunicable condition exits, the response start time is shortened so that the time at which the VIN code is transmitted after the VIN code transmission request is issued by the tester 50 is shortened. Furthermore, the usability of the communication line L can be improved by reducing unnecessary waiting time. It is determined whether the ECU is under the incommunicable condition based on whether the time during which the ECU has not transmitted data reaches the predetermined threshold time. Therefore, the determination for the data transmission condition of the ECU can be easily made. Furthermore, the waiting time is efficiently shortened and the usability of the communication line L is effectively improved since the response start time is shortened relative to the number of the ECUs under the incommunicable condition.

Steps S510 through S580 shown in FIG. 10 and steps S730 through S780 shown in FIG. 11 correspond to the time shortening means. In the process shown in FIG. 11, the fixed value . is subtracted from the response start time Tn. However, each ECU may store multiple values for the response start time Tn in advance, and select an appropriate value among those values based on the numbers and the kinds of the ECUs under the incommunicable condition.

Second Modification of the First Embodiment

Figure 12:
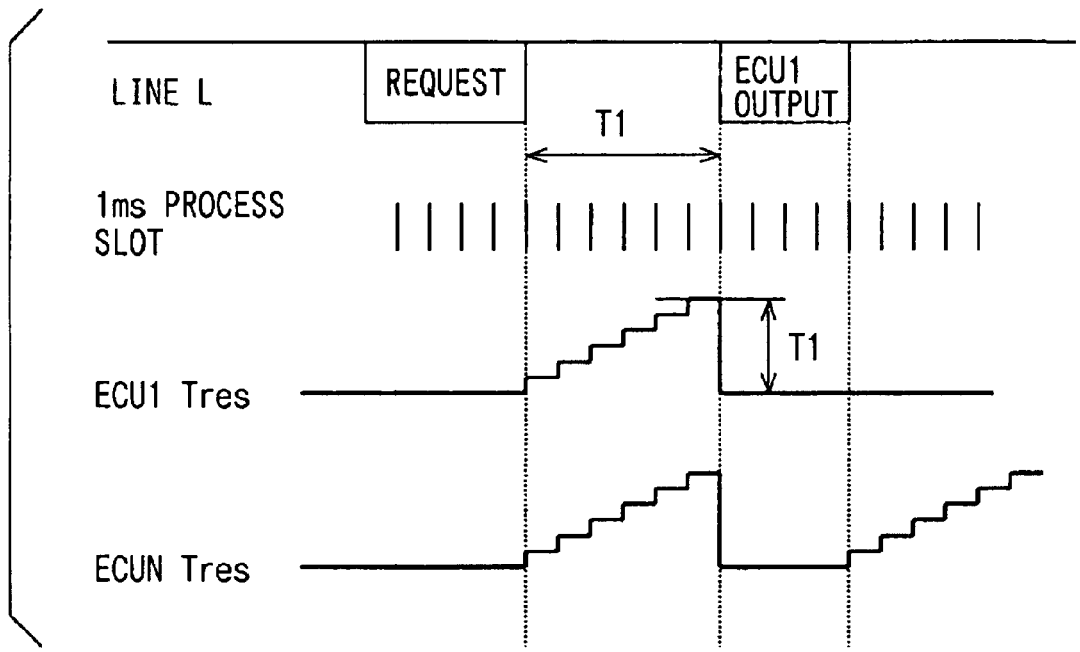
FIG. 12 is an explanatory diagram showing a communication procedure for vehicle identifying information according to the second modification of the first embodiment.

Referring to FIG. 12, when the ECU 1 and the ECUN (N=2, 3, 4) receives the VIN code transmission request from the tester 50, each ECU 1, 2, 3, 4 sets the VIN code request flag VINReq ON, and starts counting the time by activating the timer 1c, 2c, 3c, 4c. When the time count Tres of the timer 1c reaches the response start time T1, the ECU 1 starts the VIN code transmission process and clears the timer 1c.

The ECUN monitors the transmission process performed by another ECU 2, 3, 4 via the communication line L, and they initialize (clear) the count Tres of the timer 2c, 3c, 4c when the start of the transmission process performed by the ECU 1 is detected. If the ECU 1 does not successfully transmit data to the tester 50 due to noise, the ECUN starts counting the time when the termination of the transmission process performed by the ECU 1 is detected.

Each ECU 1, 2, 3, 4 can determine whether the VIN code has been successfully transmitted by another ECU 1, 2, 3, 4 based on the contents of the VIN code in the transmitted data of the cs value. FIG. 12 shows the case that the transmission process has been started by the ECU 1 but the VIN code date is not successfully transmitted. If the ECU 1 is under the incommunicable condition, the VIN code transmission process is not started by the ECU 1 even when the time reaches the response start time T1. As a result, the ECUN continues counting without initializing the count Tres of the timer 2c, 3c, 4c.

The process performed by the MC 1a, 2a, 3a, 4a of each ECU 1, 2, 3, 4 for implementing the steps shown in FIG. 12 will be discussed referring to the flowchart shown in FIG. 13. Specifically, the process shown in FIG. 13 is performed in addition to the process shown in FIG. 6 among the communication processing shown FIG. 5 through FIG. 8 of the first embodiment.

Figure 13:
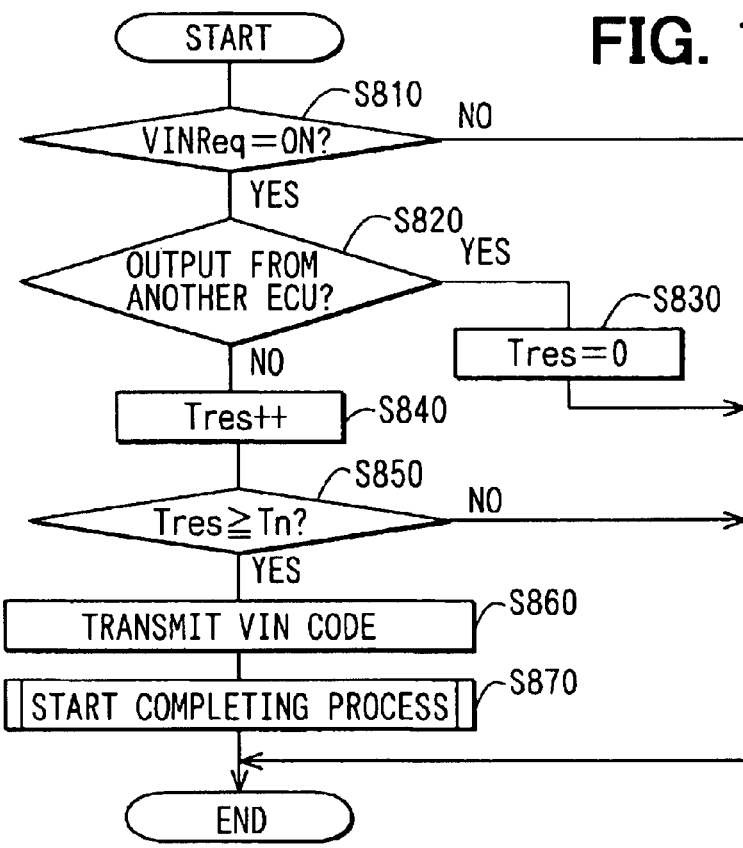
FIG. 13 is a flowchart showing a communication processing of the vehicle identifying information according to the second modification.

In a 1 ms process shown in FIG. 13, if it is determined that the VIN code request flag VINReq is ON (S810: YES), it is then determined whether the transmission process has been performed by another ECU 1, 2, 3, 4 (S820). Each ECU 1, 2, 3, 4 is configured to start the transmission process when it receives the VIN code transmission request from the tester 50. Therefore, the ECU 1, 2, 3, 4 can determine whether the transmission process has been started by another ECU 1, 2, 3, 4 by detecting transmitted data on the communication line L.

If it is determined that the transmission process has not been started by any ECU 1, 2, 3, 4 (S820: NO), the ECU 1, 2, 3, 4 completes this 1 ms process after performing the steps S840 through S870 in the same manner as steps S220 through S250 of the first embodiment. If it is determined that the transmission process has been started by another ECU 1, 2, 3, 4 (S820: YES), the ECU 1, 2, 3, 4 completes this 1 ms process after clearing the count Tres of the timer 1c, 2c, 3c, 4c (S830).

By clearing the count Tres when the start of the VIN code transmission is detected, a limitation in setting the response start time Tn, that is, setting the time at intervals longer then the time required for the VIN code transmission, can be eliminated. As a result, the flexibility in setting the response start time Tn for each ECU 1, 2, 3, 4 increases. The VIN code transmission process performed by each ECU 1, 2, 3, 4 is started at intervals at least longer than the time T1 after the receipt of the VIN code transmission request issued by the tester 50 or the completion of the transmission process. Therefore, the system meets the requirement of the communication procedure that a certain period must be provided after the completion of data transmission until the start of the next data transmission.

Moreover, each ECU 1, 2, 3, 4 continues the count of the timer 1c, 2c, 3c, 4c without clearing the count Tres after the response start time has elapsed when the ECU with higher priority is under the incommunicable condition. Therefore, the time between the issuance of the VIN code transmission request by the tester 50 and the start of the VIN code transmission (response waiting time) can be shortened. By reducing unnecessary waiting time, the usability of the communication line L can be improved.

Second Embodiment

Figure 14:
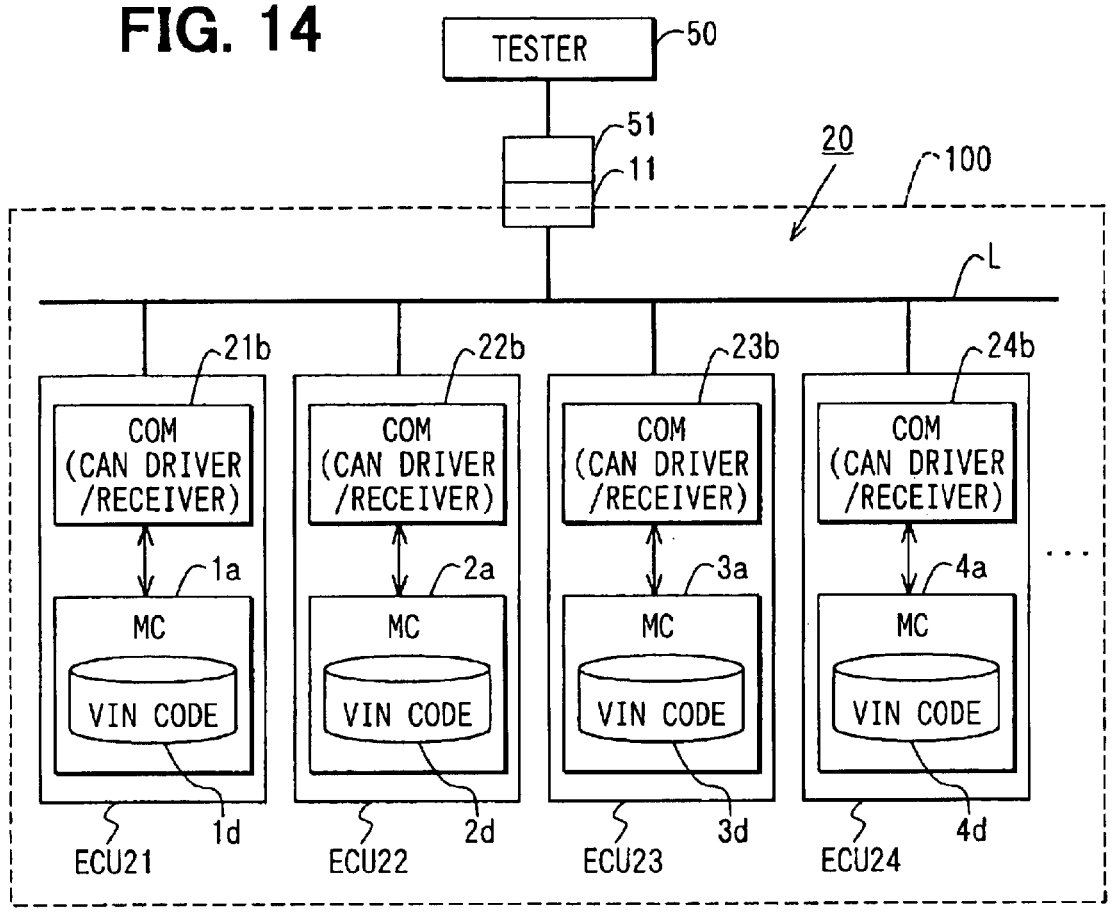
FIG. 14 is a block diagram showing a schematic view of a vehicular electronic control system according to the second embodiment of the present invention.

Referring to FIG. 14, the vehicular electronic control system 20 is configured basically the same as the vehicular electronic control system 10 (FIG. 1). Each ECU 21, 22, 23, 24 includes a controller area network (CAN) driver/receiver as a communication unit (COM) 21b, 22b, 23b, 24b for performing data communication according to CAN, which is a commonly used protocol in an onboard network. With this configuration changes, communication processing performed by a MC 21, 22, 23, 24 of each ECU 21, 22, 23, 24 is different from that performed by the MCs 1a, 2a, 3a, 4a.

The electronic control system 20 is installed on the vehicle 100. It includes an engine ECU 21, a transmission ECU 22, a driving control ECU 23, and a body ECU 24. The ECUs 21, 22, 24, and 24 control an engine, an automatic transmission, a braking system, and power windows or power door locks, respectively.

The COM 21b, 22b, 23b, 24b of each ECU 21, 22, 23, 24 performs communication using the CAN protocol. The COM 21b, 22b, 23b, 24b adds an identification code (CANID), which is assigned to the ECU 21, 22, 23, 24 and used for determining order of precedence, to a header of a frame that is transmitted. The COM 21b, 22b, 23b, 24b having the frame immediately starts transmitting the frame if the communication line L is not busy. If the line L is busy, it starts transmitting the frame when the line L becomes available. Therefore, if multiple ECUs 21, 22, 23, 24 are ready for frame transmission and start the frame transmission all at once when the line L becomes available, collisions of the frames occur on the line L.

When such frame collisions occur, in the CAN protocols, arbitration control for deciding which frame to give priority for processing using the CANID. The arbitration control is performed by using a method called nondestructive bitwise arbitration.

A signal level on the line L is either dominant or recessive. When dominant signals and recessive signals are transmitted by multiple ECUs 21, 22, 23, 24, the signal level on the line L is dominant. Logical values of the dominant level and the recessive level are 0 and 1, respectively.

The CANID has a 4-bit (11-bit in the actual CAN protocol) construction, and three ECUs 21, 22, 23 start transmitting the frames at the same time, the CANIDs assigned to the frames from the first ECE 21, the second ECU 22, and the third ECU 23 are 0001B, 0010B, and 0100B, respectively. In this case, when the second most significant bit of the CANID is transmitted, the signal level of the line L becomes dominant (0) even though the output of the third ECU 23 is recessive (1). As a result, priority is not given to the third ECU 23 at this time, and the third ECU 23 stops the frame transmission and enters a data receiving state. In the same manner, when the third most significant bit of the CANID is transmitted, the signal level of the line L becomes dominant even though the output of the second ECU 22 is recessive. Therefore, priority is not given to the second ECU 22 at this time, and the second ECU 22 stops the frame transmission and enters a data receiving state. Thus, the first ECU 21 is given priority and continues sending the frame.

In the communication system using the CAN protocol, an ECU that has transmitted a frame with the smallest logical value of the CANID gets priority when multiple frames are transmitted to a communication line. The logical values of the CANID are set in ascending order of the ECU 21, the ECU 22, the ECU 23, the ECU 24. In other words, the priorities in the arbitration control are given to the ECU 21, the ECU 22, the ECU 23, and the ECU 24 in that order.

Figure 15:
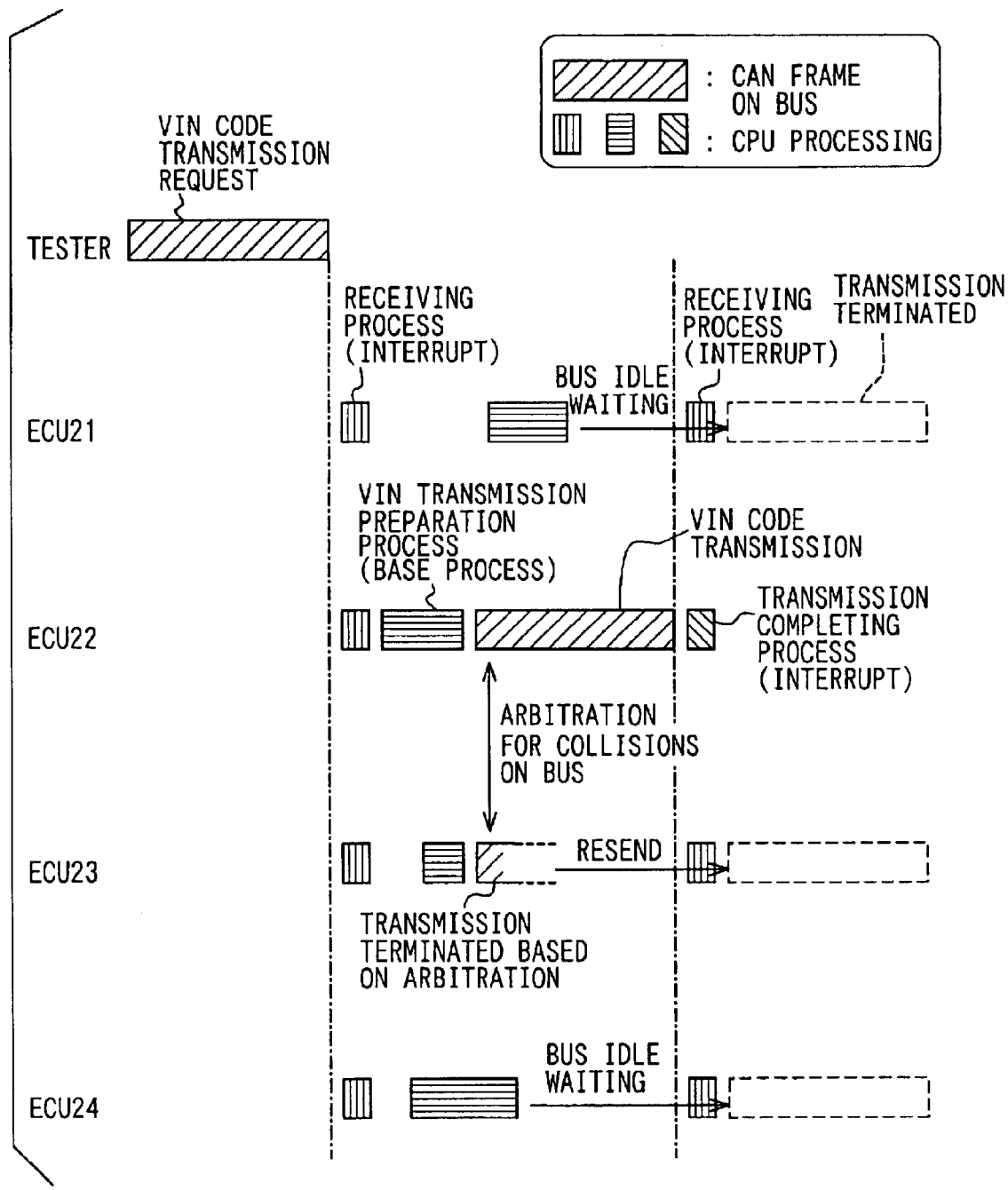
FIG. 15 is an explanatory diagram showing a communication procedure for vehicle identifying information according to the second embodiment.

The communication processing for the vehicle identifying information between the tester 50 and the vehicular electronic control system 20 will be explained. Referring to FIG. 15, when the connector 51 of the tester 50 is connected to the connector 11 and the VIN code transmission requests are issued to all ECUs 21, 22, 23, 24 based on the input entered by an operator via the input device. The ECU 21, the ECU 22, the ECU 23, and the ECU 24 start the receiving processes for receiving the frames responding to the VIN code transmission requests via the line L. Then, each ECU 21, 22, 23, 24 performs a VIN code transmission preparation process at respective timing.

In the VIN code transmission preparation process, each ECU 21, 22, 23, 24 reads the VIN code from its nonvolatile memory 1c, 2c, 3c, 4c and produces the frame for transmitting the VIN code. In FIG. 15, the reason why the time required for the VIN code transmission preparation process is different from ECU to ECU is because of the performance of each ECU 21, 22, 23, 24, for instance, a driving clock, and programs used in the ECU 21, 22, 23, 24.

When completed the VIN transmission preparation process, each ECU 21, 22, 23, 24 requests for starting the VIN code transmission to its COM 21b, 22b, 23b, 24b. By this operation, the COM 21b, 22b, 23b, 24b starts transmitting the VIN code when the line L becomes available. The ECU 22 and the ECU 23 start transmitting the VIN code at the same time, and the transmission process of the ECU 23 is terminated based on the arbitration using the CANIDs, that is, the transmission process of the ECU 23 is terminated because the priority is not given in the arbitration. In this case, the COM 23b of the ECU 23 starts transmitting the VIN code when the line L becomes available.

The ECU 22 transmits the VIN code to the tester 50. In this case, other ECUs 21, 23, 24 perform the receiving processes for receiving the frames of the VIN code transmission via the line L. When successful transmission of the VIN code is confirmed, the ECUs 21, 23, 24 request their COM 21b, 23b, 24b for termination of the VIN code transmission. The ECU 22 performs transmission completion process when the VIN code has been transmitted. If the VIN code is not successfully transmitted by the ECU 22, another ECU 21, 23, 24 starts the VIN code transmission. The ECU 21 starts transmitting the VIN code based on the arbitration using the CANIDS. If the ECU 21 has not successfully transmitted the VIN code, another ECU 23, 24 starts transmitting the VIN code.

Figure 16:
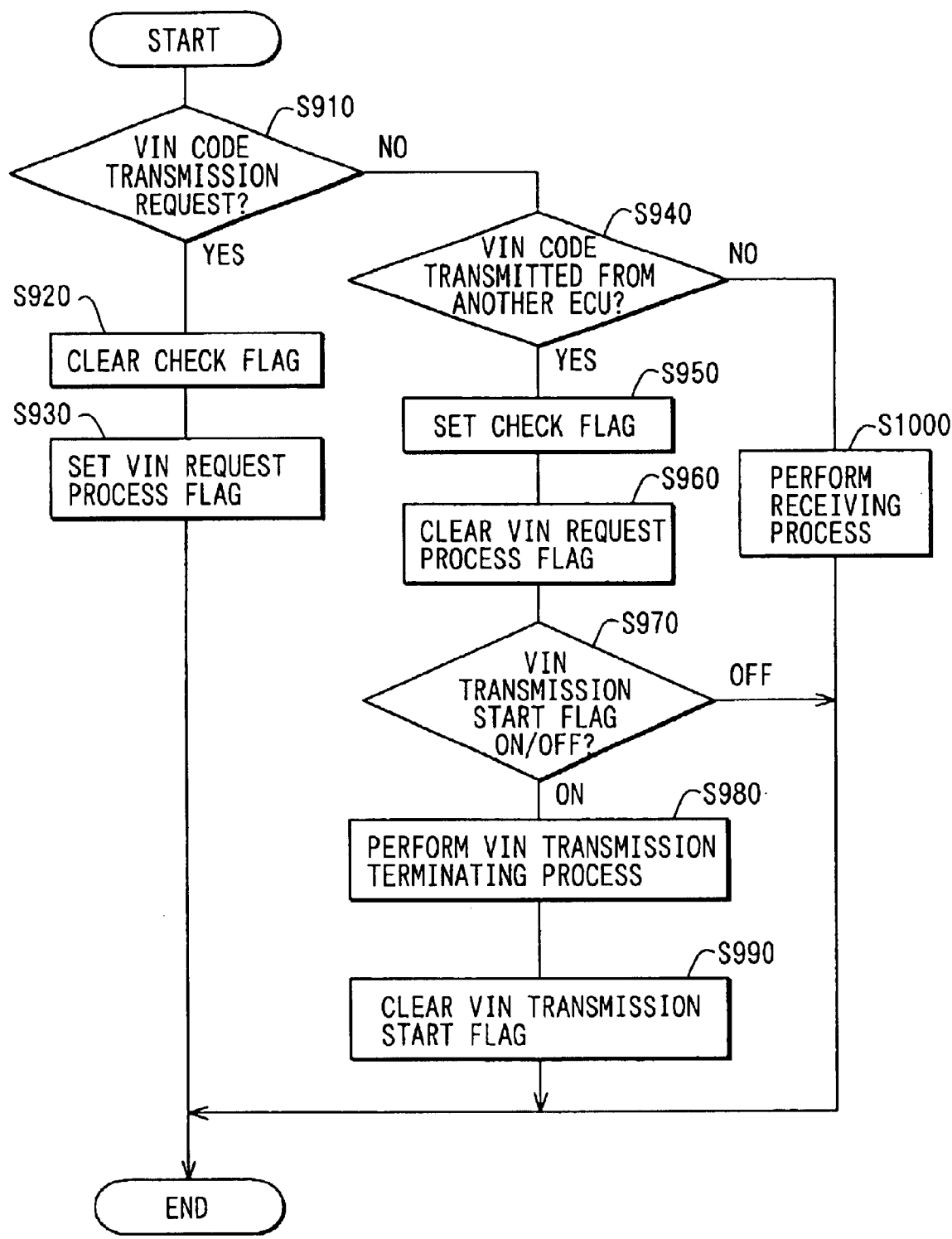
FIG. 16 is a flowchart showing a communication processing of the vehicle identifying information according to the second embodiment.
Figure 17:
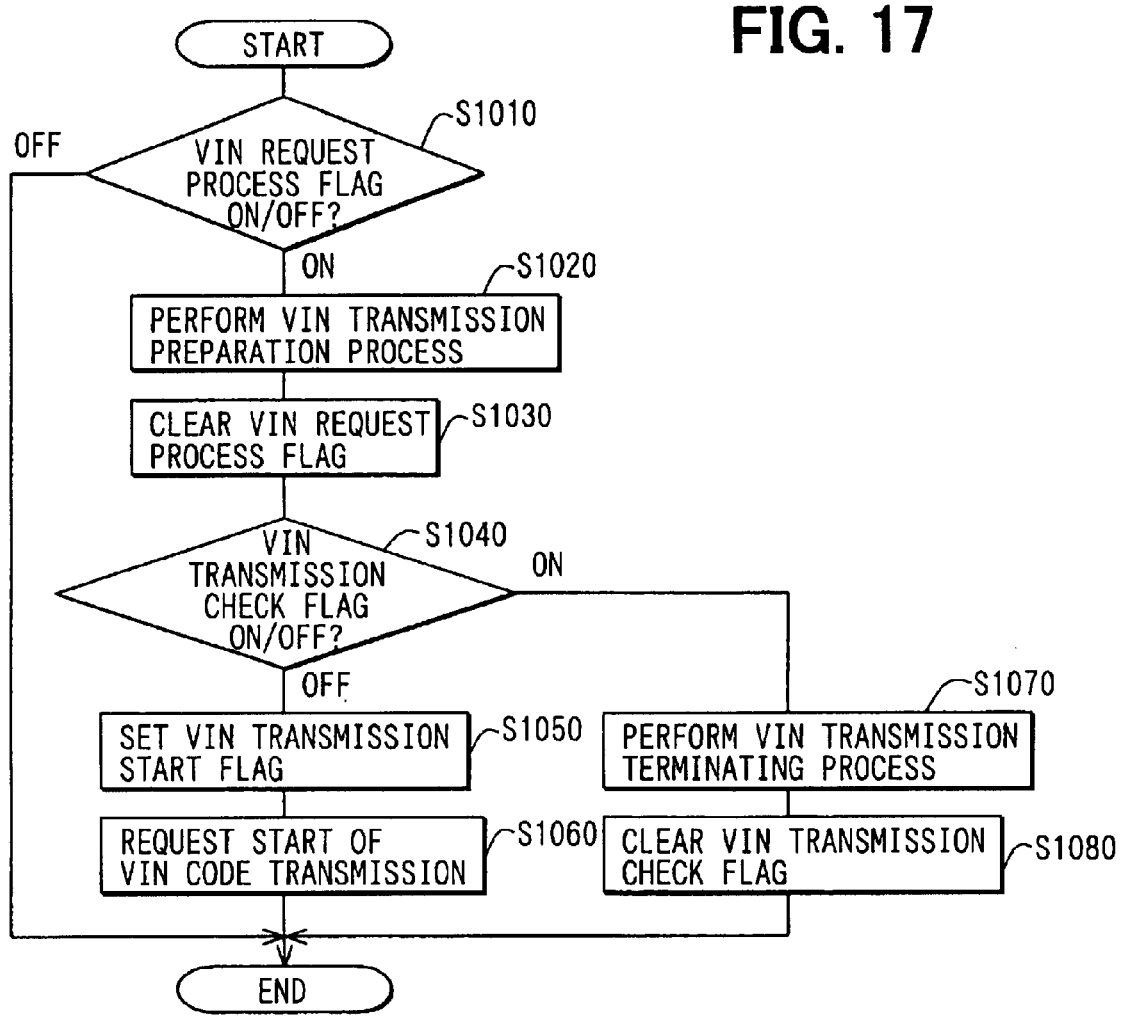
FIG. 17 is a flowchart showing a communication processing of the vehicle identifying information according to the second embodiment.
Figure 18:
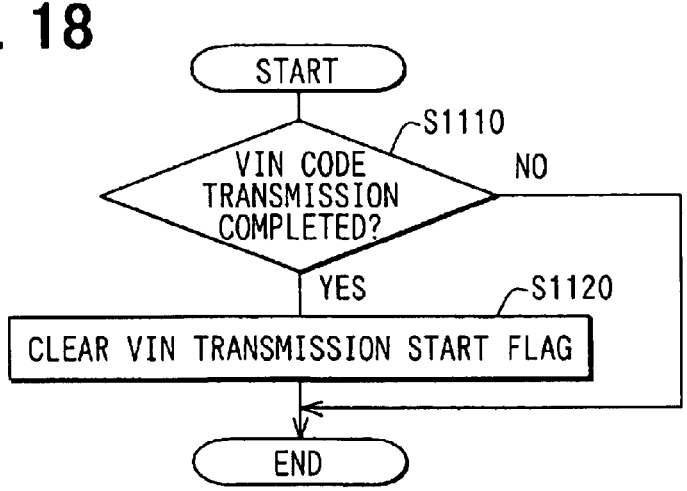
FIG. 18 is a flowchart showing a communication processing of the vehicle identifying information according to the second embodiment.

The communication processing performed by the MC 21a, 22a, 23a, 24a of each ECU 21, 22, 23, 24 will be explained referring to the flowcharts shown in FIGS. 16 through 18. Referring to FIG. 16, the receiving process is started when data (frame) is detected the line L. When the receiving process is started, it is determined whether detected data is a VIN code transmission request issued by the tester 50 (S910).

If it is determined that the detected data is the VIN code transmission request (S910: YES), a VIN transmission check flag that indicates the VIN code has been successfully transmitted by another ECU 21, 22,23,24 is cleared (OFF) for initialization (S920). Then, a VIN request processing flag that indicates the VIN code transmission request issued by the tester 50 has been received is set (S930) and this process is completed. If it is determined that the detected data is not the VIN code transmission request (S910: NO), it is determined whether it is a VIN code transmission by another ECU 21, 22, 23, 24 (S940). More specifically, it is determined whether it is a VIN code transmission that has been successfully completed.

If it is determined that the data is the VIN code transmission by another ECU 21, 22, 23, 24 (S940: YES), the VIN transmission flag is set (S950), and the VIN request processing flag is cleared (S960). The VIN request processing request flag is cleared in step S960 so that the VIN code transmission is not redundantly performed. It is determined a VIN transmission start flag is ON or OFF (S970). The VIN transmission start flag indicates that a start of the VIN code transmission is requested to the COM 21b, 22b, 23b, 24b.

If the VIN transmission start flag is OFF, that is, the VIN code transmission start is not requested to the COM 21b, 22b, 23b, 24b (S970: OFF), this receiving process is completed. If the VIN transmission start flag is ON, that is, the VIN code transmission start is requested to the COM 21b, 22b, 23b, 24b (S970: NO), a VIN transmission terminating process for requesting for terminating the VIN code transmission to the COM 21b, 22b, 23b, 24b (S980). The VIN transmission start flag is cleared and this receiving process is completed.

It is determined that the data is not the VIN code transmission by another ECU 21, 22, 23, 24 in step S940 (S940: NO), a receiving process appropriate for the detected data, for instance, engine revolution speed data, is performed (S1000). Then, this receiving process is completed.

A base processing shown in FIG. 17 will be explained. This base processing is performed at regular intervals predetermined for each ECU 21, 22, 23, 24, for instance, every 1 ms, 4 ms, and 8 ms. When the base processing is started, it is determined the VIN request processing flag is ON or OFF (S1010). If the VIN request processing flag is OFF (S1010: OFF), this base processing is completed. If the VIN request processing flag is ON (S1010: ON), the VIN transmission preparation process for producing a frame for transmitting the VIN code is performed (S1020). Then, the VIN request processing flag is cleared (S1030).

It is determined the VIN transmission check flag is ON or OFF (S1040). If the VIN transmission check flag is ON (S1040: OFF), the VIN transmission start flag is set ON (S1050). Then, transmission of the frame produced in the VIN transmission preparation process (S1020) to the tester 50 is requested the COM 21b, 22b, 23b, 24b (S1060). In other words, the start of the VIN code transmission is requested to the COM 21b, 22b, 23b, 24b. Then, this base processing is completed. If the line L is busy, the COM 21b, 22b, 23b, 24b starts transmitting the frame when the line L becomes available. When the VIN code transmission by another ECU 21, 22, 23, 24 is detected (S940) before transmitting the frame, the ECU 21, 22, 23, 24 requests the VIN code transmission terminating request to the COM 21b, 22b, 23b, 24b (S980).

If the VIN transmission check flag is ON (S1040: ON) in step S1040, the VIN transmission terminating process for terminating the VIN code transmission is performed (S1070). The VIN transmission check flag is cleared (S1080), and this base process is completed. The VIN transmission check flag is set ON in step S1040 after the process of step S1010 in this base process is performed and the VIN transmission check flag is set ON in the receiving process S950. When the VIN code transmission by another ECU is detected while the VIN transmission preparation process (S1020) is performed, the process proceeds to step S1070.

A transmission completing process will be discussed referring to FIG. 18. This transmission completing process is started by completing data (frame) transmission. When the transmission completing process is started, it is determined whether the data that has been transmitted is VIN code transmission (S1110). If it is not a completion of the VIN code transmission (S1110: NO), this transmission completing process is completed. If it is the completion of the VIN code transmission (S1110: YES), the VIN transmission start flag is cleared (S1120), and this transmission completing process is completed.

In the electronic control system 20, priorities are not assigned to the ECUs 21, 22, 23, 24 for transmitting the VIN code to the tester 50. The VIN code is transmitted by the ECU 21, 22, 23, 24 that has completed the transmission preparation process first. When the ECU 21, 22, 23, 24 is not able to successfully transmit the VIN code, other ECUs 21, 22, 23, 24 send the VIN code in order of precedence. Therefore, the electronic control system 20 responds to the VIN code request issued by the tester 50 without fail.

Each ECU 21, 22, 23, 24 monitors the line L. When the VIN code transmission by another ECU 21, 22, 23, 24 is completed, the ECU 21, 22, 23, 24 terminates the VIN code transmission process and does not transmit the VIN code. Therefore, the OBD-II requirement that the number of VIN codes transmitted from one vehicle must be one is satisfied. The nonvolatile memory 1d, 2d, 3d, 4d, the COM 21b, 22b, 23b, 24b, and the MC 1a, 2a, 3a, 4a of each ECU 21, 22, 23, 24 correspond to the storage means, the communication means, and the detecting means, respectively.

The present invention should not be limited to the embodiment previously discussed and shown in the figures, but may be implemented in various ways without departing from the spirit of the invention. For example, in the above embodiments, the engine ECUs, the transmission ECUs, the driving control ECUs, and the body ECUs are provided as electronic control units included in the vehicular electronic control system of the present invention. However, other electronic control units for controlling other components of the vehicle can be included.

Furthermore, priorities are assigned to multiple ECUs in the above embodiments. However, the priorities are assigned as appropriate for design.

What is claimed is:

1. An vehicular electronic control system having a plurality of electronic control units that are intercommunicative with each other via a communication line for data transmission and configured to transmit vehicle identifying information, which is unique to the vehicle, on demand from an external scan tool connected to the communication line, wherein each electronic control unit comprises:
   a storing means for storing the vehicle identifying information;
   a detecting means for monitoring the communication line and detecting an output indicative of the vehicle identifying information sent from any one of other electronic control units to the external scan tool;
   a timing means for timing an elapsed time since the electronic control unit has received a vehicle identifying information transmission request from the external scan tool and a response start time that is preset for each electronic control unit based on order of precedence; and
   a communication means for reading the vehicle identifying information from the storing means and transmitting the vehicle identifying information to the external scan tool if the detecting means has not detected the output indicative of the vehicle identifying information to the external scan tool when the response start time has elapsed.

2. The vehicular electronic control system according to claim 1, wherein the detecting means starts monitoring the communication line for detecting the output when the electronic control unit has received the vehicle identifying information from the external scan tool.

3. The vehicular electronic control system according to claim 1, wherein the detecting means detects a target address to which data on the communication line is transmitted, and determines whether a content of the data is the vehicle identifying information only when the target address is an address of the external scan tool.

4. The vehicular electronic control system according to claim 1, wherein each electronic control unit terminates processes performed by the detecting means and the timing means when the output sent from any one of other electronic control units has transmitted the vehicle identifying information to the external scan tool.

5. The vehicular electronic control system according to claim 1, wherein the response start time of each electronic control unit is set at intervals, each of which is longer than a time required for transmitting the vehicle identifying information.

6. The vehicular electronic control system according to claim 1, wherein the timing means of each electronic control unit stops timing when another electronic control unit has started transmitting the vehicle identifying information and starts timing an elapsed time since the other electronic control unit has terminated the transmission in a case that the vehicle identifying information is not successfully transmitted.

7. The vehicular electronic control system according to claim 1, wherein:
- each electronic control unit further comprises a time shortening means;
- the communication means of each electronic control unit determines whether other electronic control units having shorter response start time is under an incommunicable condition; and
- the time shortening means shortens the response start time when the communication means has determined that another electronic control unit is under the incommunicable condition.

8. The vehicular electronic control system according to claim 7, wherein the time shortening means of each electronic control unit monitors the communication line, and determines that another electronic control unit having shorter response start time is in the incommunicable condition if the electronic control unit has not transmitted data for longer than a predetermined time.

9. The vehicular electronic control system according to claim 7, wherein the time shortening means of each electronic control unit shortens the response start time so that the response start time becomes shorter as the number of electronic control unit determined as in the incommunicable condition increases.

10. An electronic control unit that is installed on a vehicle, intercommunicative with other electronic control units via a communication line, and capable of transmitting vehicle identifying information of the vehicle on demand from an external scan tool connected to the electronic control unit via the communication line, comprising:
- a storing means for storing the vehicle identifying information;
- a detecting means for monitoring the communication line and detecting an output indicative of the vehicle identifying information sent from any one of other electronic control units to the external scan tool;
- a timing means for timing an elapsed time since the electronic control unit has received a vehicle identifying information transmission request from the external scan tool and a response start time that is preset for each electronic control unit based on order of precedence; and
- a communication means for reading the vehicle identifying information from the storing means and transmitting the vehicle identifying information to the external scan tool if the detecting means has not detected the output indicative of the vehicle identifying information to the external scan tool when the response start time has elapsed.

11. The electronic control unit according to claim 10, wherein the detecting means starts monitoring the communication line for detecting the output when the electronic control unit has received the vehicle identifying information from the external scan tool.

12. The electronic control unit according to claim 10, wherein the detecting means detects a target address to which data on the communication line is transmitted, and determines whether a content of the data is the vehicle identifying information only when the target address is an address of the external scan tool.

13. The electronic control unit according to claim 10, wherein the detecting means terminates processes performed by the detecting means and the timing means when the output sent from any one of other electronic control units has transmitted the vehicle identifying information to the external scan tool.

14. The electronic control unit according to claim 10, wherein the response start time is set at intervals, each of which is longer than a time required for transmitting the vehicle identifying information.

15. The electronic control unit according to claim 10, wherein the timing means stops timing when another electronic control unit has started transmitting the vehicle identifying information and starts timing an elapsed time since the other electronic control unit has terminated the transmission in a case that the vehicle identifying information is not successfully transmitted.

16. The electronic control unit according to claim 10, wherein:
- the communication means further comprises a time shortening means;
- the communication means determines whether other electronic control units having shorter response start time is under an incommunicable condition; and
- the time shortening means shortens the response start time when the communication means has determined that another electronic control unit is under the incommunicable condition.

17. The electronic control unit according to claim 16, wherein the time shortening means monitors the communication line and determines that another electronic control unit having shorter response start time is in the incommunicable condition if the electronic control unit has not transmitted data for longer than a predetermined time.

18. The electronic control unit according to claim 16, wherein the time shortening means shortens the response start time so that the response start time becomes shorter as the number of electronic control unit determined as in the incommunicable condition increases.

19. A program for operating computing means as the detecting means, the timing means, and the communication means in the electronic control unit claimed in claim 10.

20. A storage medium for storing the program claimed in claim 19, wherein the storage medium is computer-readable.

21. An vehicular electronic control system having a plurality of electronic control units that are intercommunicative with each other via a communication line for data transmission and configured to transmit vehicle identifying information, which is unique to the vehicle, on demand from an external scan tool connected to the communication line, wherein each electronic control unit comprises:
- a storing means for storing the vehicle identifying information;
- a detecting means for monitoring the communication line and detecting an output indicative of the vehicle identifying information sent from any one of other electronic control units to the external scan tool;
- a communication means for transmitting data that has been requested; and
- a transmission requesting means for requesting the communication means to transmit the vehicle identifying information stored in the storing means to the external scan tool if the detecting means has not detected the output when the electronic control unit has received a vehicle identifying information transmission request from the external scan tool and to stop the vehicle identifying information transmission when the detecting means has detected the output from another electronic control unit after the electronic control unit has received the request, wherein the communication means transmits the data upon the data transmission request if the communication line is available, transmits the data when the communication line becomes available if the communication line is busy at a time when the data transmission request is received, and transmits the data according to a decision of arbitration made based on order of precedence predetermined for each electronic control unit when another electronic unit is ready for data transmission at the same time.

22. The vehicular electronic control system according to claim 21, wherein the communication means transmits the data with an identification code used for determining the order of precedence and stops the data transmission if the identification code does not match an identification code on the communication line.

23. An electronic control unit that is installed on a vehicle, intercommunicative with other electronic control units via a communication line, and capable of transmitting vehicle identifying information of the vehicle on demand from an external scan tool connected to the electronic control unit via the communication line, comprising:

a storing means for storing the vehicle identifying information;

a detecting means for monitoring the communication line and detecting an output indicative of the vehicle identifying information sent from any one of other electronic control units to the external scan tool;

a communication means for transmitting data that has been requested; and a transmission requesting means for requesting the communication means to transmit the vehicle identifying information stored in the storing means to the external scan tool if the detecting means has not detected the output when the electronic control unit has received a vehicle identifying information transmission request from the external scan tool and to stop the vehicle identifying information transmission when the detecting means has detected the output from another electronic control unit after the electronic control unit has received the request, wherein the communication means transmits the data upon the data transmission request if the communication line is available, transmits the data when the communication line becomes available if the communication line is busy at a time when the data transmission request is received, and transmits the data according to a decision of arbitration made based on order of precedence predetermined for each electronic control unit when another electronic unit is ready for data transmission at the same time.

24. The electronic control unit according to the claim 23, wherein the communication means transmits the data with an identification code used for determining the order of precedence and stops the data transmission if the identification code does not match an identification code on the communication line.

25. A program for operating computing means as the detecting means and the transmission requesting means in the electronic control unit claimed in claim 23.

26. A storage medium for storing the program claimed in claim 25, wherein the storage medium is computer-readable.

* * * * *

UNITED STATES PATENT AND TRADEMARK OFFICE
CERTIFICATE OF CORRECTION

PATENT NO.     : 6,799,106 B2
DATED          : September 28, 2004
INVENTOR(S)    : Fukushima, T. et al.

It is certified that error appears in the above-identified patent and that said Letters Patent is hereby corrected as shown below:

<u>Title page,</u>
Item [75], Inventors, change the third inventor's name to -- Masahiro --.

Signed and Sealed this

Seventeenth Day of May, 2005

JON W. DUDAS
*Director of the United States Patent and Trademark Office*